UNITED STATES PATENT OFFICE.

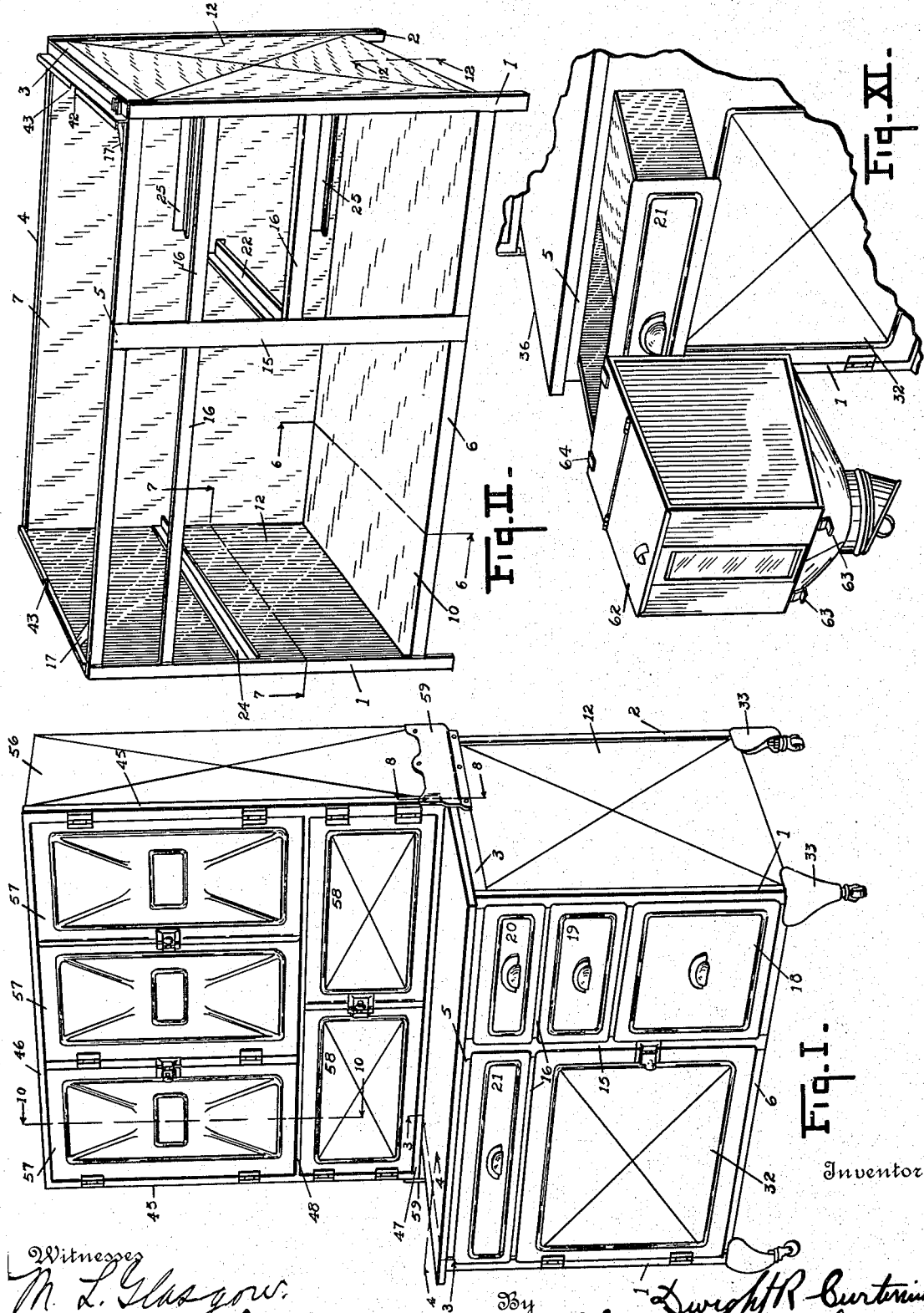

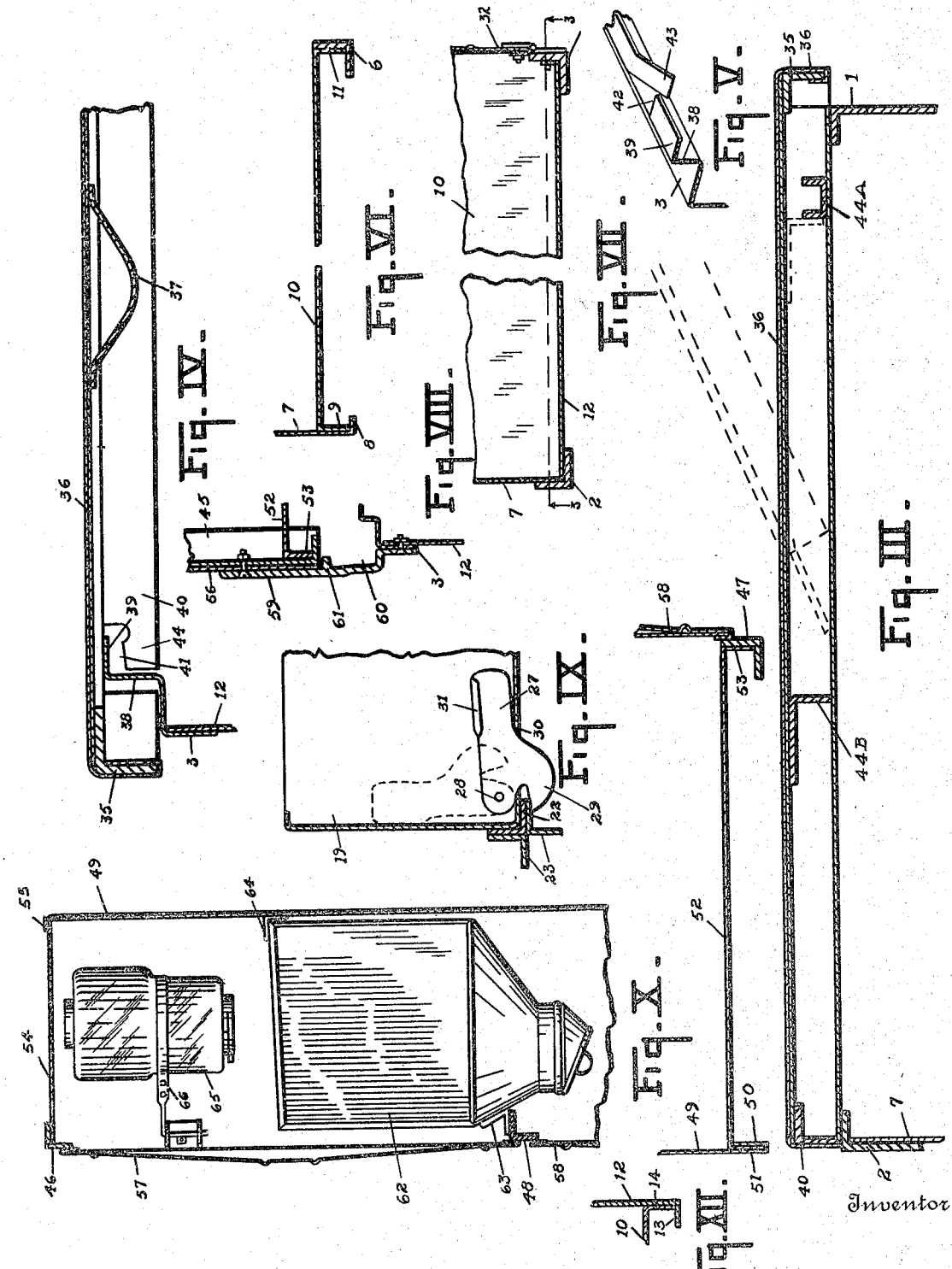

DWIGHT R. CURTENIUS, OF KALAMAZOO, MICHIGAN, ASSIGNOR TO KALAMAZOO STOVE COMPANY, OF KALAMAZOO, MICHIGAN.

KITCHEN-CABINET.

1,203,589.   Specification of Letters Patent.   Patented Nov. 7, 1916.

Application filed June 15, 1914. Serial No. 845,185.

*To all whom it may concern:*

Be it known that I, DWIGHT R. CURTENIUS, a citizen of the United States, residing at Kalamazoo, Michigan, have invented certain new and useful Improvements in Kitchen-Cabinets, of which the following is a specification.

This invention relates to improvements in kitchen cabinets.

The main objects of this invention are: First, to provide an improved kitchen cabinet formed of metal in which the parts are simple and economical to produce and assemble and the structure is very rigid and durable and at the same time attractive in appearance. Second, to provide in a metal kitchen cabinet an improved means for connecting the top or superstructure with the body or base portion. Third, to provide in a metal kitchen cabinet an improved drawer structure. Fourth, to provide in a kitchen cabinet an improved adjustable top structure. Fifth, to provide in a metal kitchen cabinet an improved flour bin structure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a front perspective view of a kitchen cabinet structure embodying the features of my invention. Fig. II is a front perspective view of the base portion with the top or superstructure removed and the drawers, doors, and part of the drawer slides omitted. Fig. III is a detail vertical section on a line corresponding to line 3—3 of Figs. I and VII. Fig. IV is an enlarged detail vertical section on a line corresponding to line 4—4 of Fig. I, showing details of the table top and its slide. Fig. V is a detail perspective view of one of the top slides. Fig. VI is a detail vertical section on a line corresponding to line 6—6 of Fig. II. Fig. VII is a detail horizontal section on a line corresponding to line 7—7 of Fig. II. Fig. VIII is a detail vertical section on a line corresponding to line 8—8 of Fig. I, showing details of the supporting brackets for the superstructure. Fig. IX is a detail vertical section through one of the drawers showing details of the drawer guide and retainer. Fig. X is a vertical central section on a line corresponding to line 10—10 of Fig. I, from front to rear through the flour bin compartment showing the flour bin arranged therein. Fig. XI is a detail perspective view showing the flour bin removed from its compartment and supported upon one of the drawers in position for filling. Fig. XII is a detail vertical section on a line corresponding to line 12—12 of Fig. II showing details of the bottom and its supporting means.

In the drawing similar reference characters refer to similar parts throughout the several views, and the sectional views are taken looking in the direction of the little arrows at the ends of the section lines.

Referring to the drawing, the base or body portion of my improved kitchen cabinet comprises a frame formed of front and rear angle iron corner posts or uprights 1 and 2 disposed with their angles facing inwardly. These corner uprights are connected at the top by the top pieces 3 which are of special shape, the purpose of which will be pointed out as the description proceeds. The rear corner pieces 2 are connected at the top by the horizontal piece 4. The front corner posts are connected by the top and bottom horizontal pieces 5 and 6. These horizontal pieces are preferably of angle iron arranged with their angles facing inwardly. The back panel 7 is arranged in the angles of the rear corner members and the top horizontal piece 4 and secured therein, preferably by spot welding.

On its lower edge the rear wall or panel 7 is provided with an inturned flange 8 adapted to receive the flange 9 on the rear edge of the bottom 10. The bottom 10 is provided with a flange 11 on its front edge resting in the angle of the bottom horizontal front member 6. The end walls or panels 12 are provided with inturned flanges 13 at their lower edges adapted to receive the downturned flanges 14 of the bottom 10. The end panels are arranged in the angles of the corner posts and the horizontal end top pieces 3 and secured therein, preferably by spot welding. The upright 15 and the cross pieces 16 coact with the corner posts and the top and bottom horizontal pieces 5 and 6 in providing drawer and door frames. The top pieces 3, and 5 are preferably connected by corner braces 17. The drawers 18, 19, 20 and 21 fit into the openings formed by the frame and the cross and upright pieces 15 and 16. These drawers are likewise formed of metal. The slide 22 of the drawer 19 is formed of three angle-shaped pieces of sheet metal 23 arranged back to back, as is shown in Fig. IX, which is a cross section through the drawer and slide looking toward the rear thereof. The angle member 23 which faces the angle strip 24 on the end wall coacts therewith to form shelf ledges, the shelf not being shown. The slides for the drawers 18 and 20 are not shown in Fig. II.

Rests 25 are provided for the drawers when in their rear position. To retain the drawers upon the slides and to prevent their accidental withdrawal I provide the drawer keepers 27 which are pivoted at 28 and provided with hooks 29 adapted to swing through slots 30 in the bottom of the drawers and engage the slides as shown in Fig. IX. These retainers are pivoted on the rear wall and may be swung up, as shown by dotted lines in Fig. IX, to release the drawers which, with the slides in this position, can be freely removed. To secure the same it is only necessary to push the retainers to the position shown in full lines in Fig. IX, the retainers being provided with finger pieces 31 for convenience in this relation.

The door 32 is provided for the compartment of the base portion of the cabinet. Caster brackets 33 are secured to the lower ends of the corner posts. The top consists of an angle iron frame 35 with a metal top 36 secured thereto, the edges of the top being folded over the edges of the frame, as shown in Fig. IV. The top is provided with reinforcing strips 37 formed of sheet metal bent into U-shape. The panel of the top is preferably of zinc or suitable non-corroding metal.

The upwardly projecting arms 38 of the top pieces 3 are provided with flanges 39 which form slides for the table top. The rear piece 40 of the top frame 35 is notched at 41 to receive this slide member 39, see Fig. IV. The notch 41 is L-shaped so that when the slide is engaged therewith, the forward edge of the top is supported against downward tilting movement. To permit the engaging and disengaging of the top with the slides the slides are slit at 42 and the slit portion or tongue 43 is turned down as shown in Fig. V. This forms an opening adapted to receive the parts 44, which project under the slides, thereby permitting the top to be engaged with the slides and to be supported thereby. The top is limited in its forward movement by the stop 44$^a$ on the member 3 and the lug 44$^b$ on the under side of the top 36.

The superstructure consists of a frame formed of iron uprights and corner members 45 connected by the top piece 46, bottom piece 47 and intermediate piece 48. The rear panel 49 is provided with an upwardly projecting seam flange 50 at its lower edge adapted to receive the down turned flange 51 of the bottom 52, while at its front edge the bottom is provided with a downturned flange 53 resting in the angle of the bottom piece 47. The top panel 54 fits within the angle 55 on the upper edge of the back panel 49 and the angle of the top member 46, see Fig. X. The end panels 56 are provided with flanges, corresponding to the flange 55, at their upper edges and with seam flanges 51 corresponding to the seam flange 50 at their lower edges. As these engaging flanges are duplicates of the flanges 50, 51 and 55 they are not shown.

The front of the superstructure has suitable uprights to support the doors 57 and 58. The superstructure is mounted upon the base by means of the brackets 59 which have slide ways 60 for the ends of the top 36. The brackets are bolted to the cross pieces 3 of the base portion and to the end walls of the top portion, the brackets being provided with inwardly projecting lugs 61 on which the superstructure rests. These brackets extend entirely across the superstructure and serve as reinforcements as well as supports therefor to support the superstructure so that it is not necessary to provide a frame other than the front frame.

The flour bin 62 is provided with a support 63 on its front side adapted to rest on the inwardly projecting arm of the frame piece 48 so that it is supported in one of the compartments against the rear wall thereof, as shown in Fig. X. The flour bin is provided with hooks 64 on its rear side adapted to be engaged over the top of the drawer 21 so that the bin is supported in a convenient position for filling, the drawer being drawn out as shown in Fig. IX, when it is desired to fill the bin, which after filling can be easily placed into the compartment and is supported therein by the supports 63 engaging the frame piece 48 as described. This is of great convenience. The sugar receptacle 65 is supported on the swinging bracket 66 above the flour bin.

With the parts thus arranged the structure is comparatively simple and economical to produce and is very strong and rigid. The base portion may be used without the superstructure, although the brackets 59 are of advantage in supporting and guiding the table top in its slides.

The inside of my improved kitchen cabinet has practically no crevices as the parts are shaped to avoid this and firmly joined, preferably by spot welding. I have not attempted to illustrate this as it will be readily understood by those skilled in the art to which the invention relates. I have not attempted to maintain the relative proportion of the various parts such as the relative thickness of the angle iron frame pieces and of the walls and the relative size of the various parts, but the disclosure made will enable the ready embodiment of my improvements.

Having thus described my invention, what I claim as new and desire to secure by Letters Patent, is:

1. A cabinet structure comprising upright corner members, angle iron end top pieces secured to the upper ends of said corner members, said top pieces being provided with upwardly projecting arms having inwardly projecting flanges at their upper edges constituting top slides, and a top comprising a rectangular angle iron frame, the rear members of said frame being provided with L-shaped slots open at their lower edges and adapted to receive the said slides and their supporting arms with the projections formed by the slots extending under the slides and constituting keepers, said slides having L-shaped slits, the slit portions being struck down to provide openings through which said keepers may be introduced, the downturned portions constituting guides for the keepers.

2. A cabinet structure comprising upright corner members, end top pieces secured to the upper ends of said corner members, said top pieces being provided with upwardly projecting arms having inwardly projecting flanges at their upper edges constituting top slides, and a top comprising a rectangular angle iron frame, the rear members of said frame being provided with L-shaped slots open at their lower edges and adapted to receive the said slides and their supporting arms with the projections formed by the slots extending under the slides and constituting keepers, said slides having L-shaped slits, the slit portions being struck down to provide openings through which said keepers may be introduced, the downturned portions constituting guides for the keepers.

3. A cabinet structure comprising upright corner members, end top pieces secured to the upper ends of said corner members, said top pieces being provided with upwardly projecting arms having inwardly projecting flanges at their upper edges constituting top slides, and a top comprising a rectangular angle iron frame, the rear members of said frame being provided with L-shaped slots open at their lower edges and adapted to receive the said slides and their supporting arms with the projections formed by the slots extending under the slides and constituting keepers, said slides having openings through which said keepers may be introduced.

In witness whereof, I have hereunto set my hand and seal in the presence of two witnesses.

DWIGHT R. CURTENIUS. [L. S.]

Witnesses:
 CHAUNCEY STRONG,
 MORGAN E. PERSING.